Jan. 13, 1953  R. G. HEUN  2,625,001
GRAIN UNLOADING ATTACHMENT
Filed Feb. 1, 1950  2 SHEETS—SHEET 1
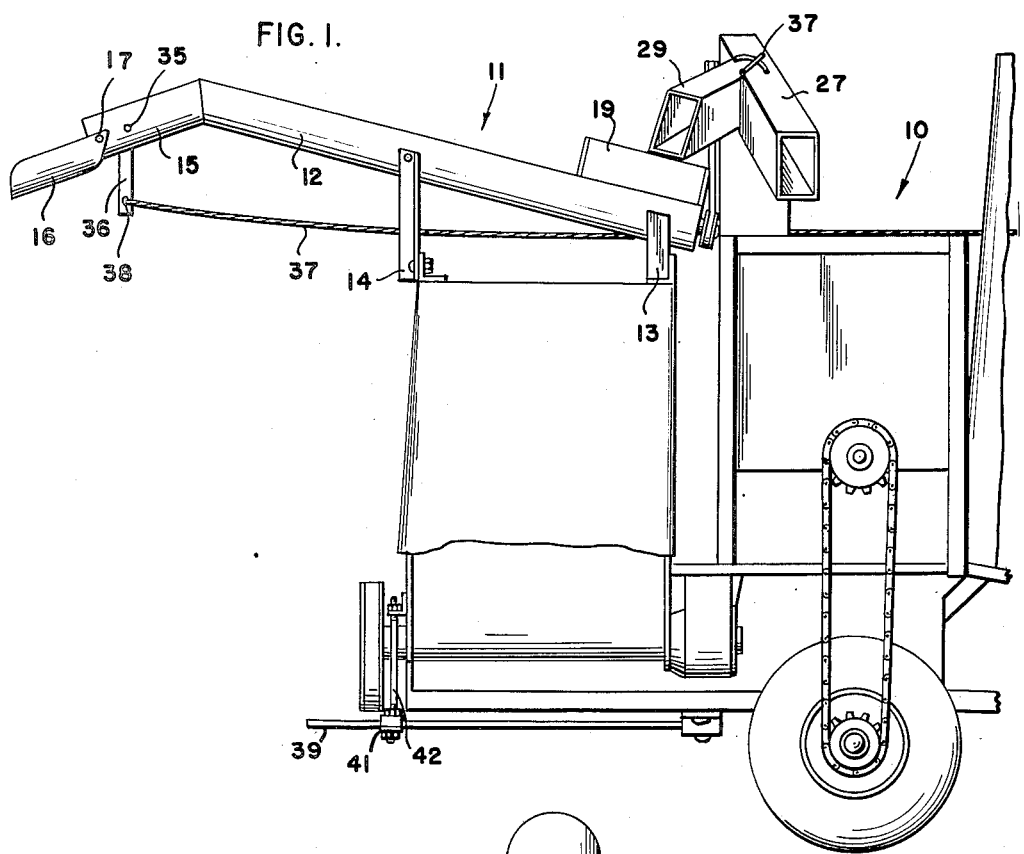
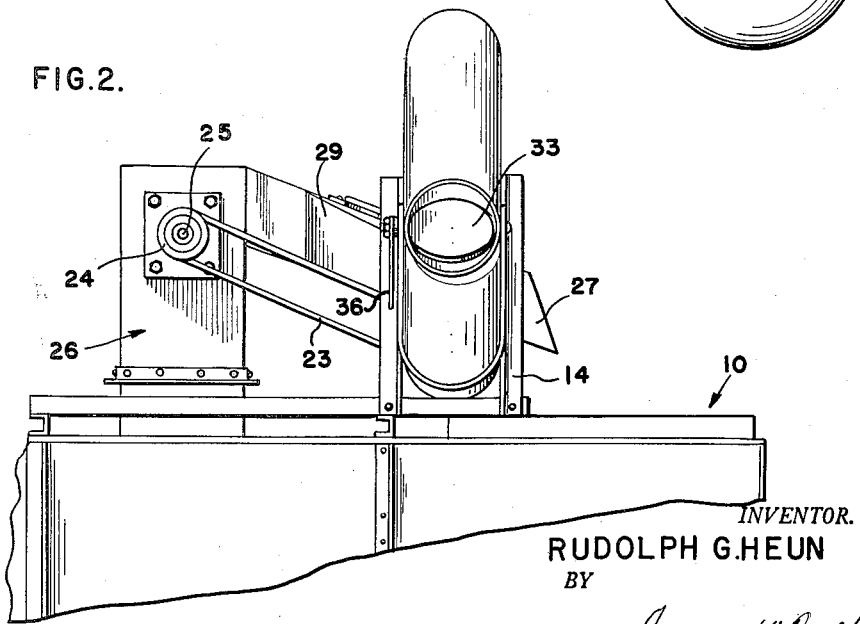
INVENTOR.
RUDOLPH G. HEUN
BY Jan. 13, 1953     R. G. HEUN     2,625,001
GRAIN UNLOADING ATTACHMENT
Filed Feb. 1, 1950     2 SHEETS—SHEET 2
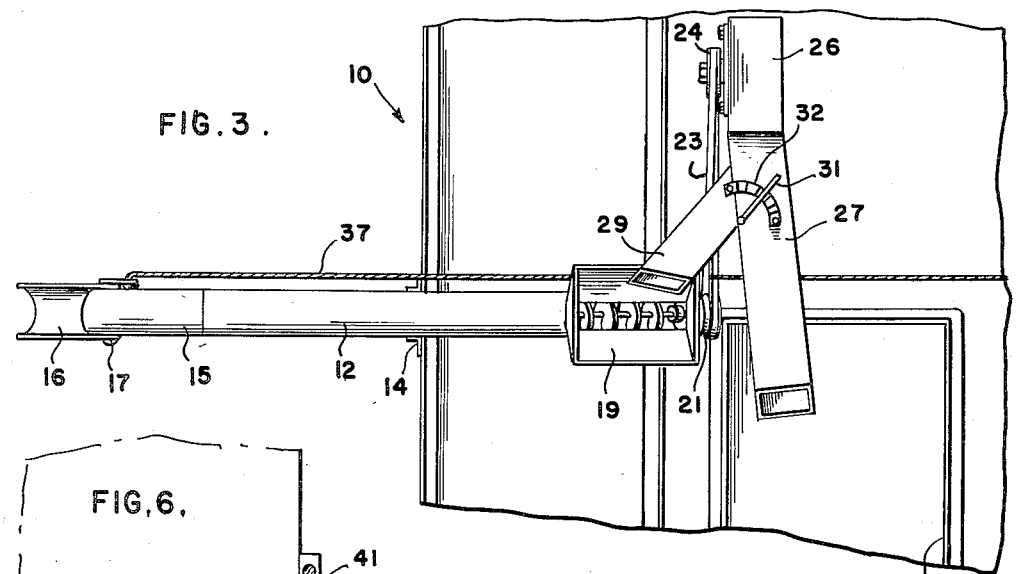
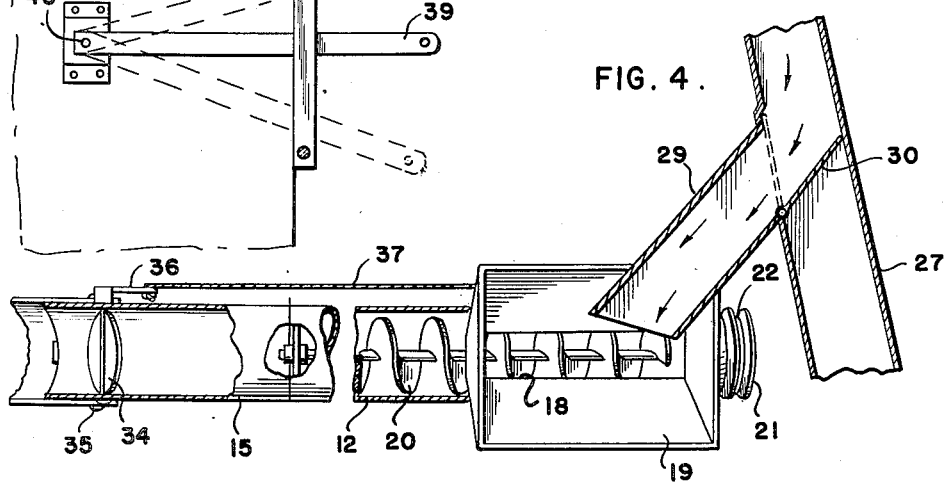
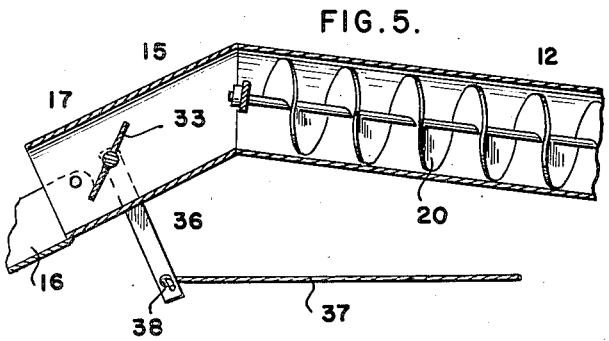
*INVENTOR.*
RUDOLPH G. HEUN
BY Patented Jan. 13, 1953

2,625,001

UNITED STATES PATENT OFFICE 2,625,001

GRAIN UNLOADING ATTACHMENT

Rudolph George Heun, Schuyler, Nebr.

Application February 1, 1950, Serial No. 141,733

5 Claims. (Cl. 56—473.5)

The present invention relates to farm machinery, and more particularly has reference to a grain unloader adapted to be attached to a combine whereby the grain which is moved by the combine elevator to the bin on the combine may be moved by the unloader for deposit into a wagon or other vehicle coupled to and trailing the combine, thereby saving considerable time and labor in periodically removing the grain from the combine bin.

The attachment is designed primarily for employment with the Allis-Chalmers "All Crop" Harvester Combine, although the inventive concept is not to be thus limited, since its adaptation to other combines will be within the province of one skilled in the art.

Broadly, the invention comprises rigidly supporting a screw conveyor on the top rear portion of the combine, with the discharge end of the conveyor projecting rearwardly of the combine and providing a drive connection between the screw and the grain elevator of the combine. The discharge spout of the elevator which directs the grain into the combine bin is provided with a supplemental spout which communicates with a hopper on the screw conveyor, and a valve is located at the juncture of the respective spouts to control the flow of grain through the desired spout.

A control valve is located within the screw conveyor adjacent the discharge end thereof, and an operating element is associated with the valve and extends to a position readily accessible to the operator of the equipment for manipulating the valve to open or close the discharge end of the conveyor.

An object of my invention is to provide a grain unloading attachment for combines of the character described which includes relatively few essential working parts, which is positive and efficient in operation, and which can be easily and inexpensively manufactured.

A further object of my invention is to provide a grain unloader for combines whereby the grain moved by the elevator may be directed into the conveyor for deposit into a vehicle following the combine, the screw conveyor also being provided with a cut-off valve to stop the grain flow when the equipment is turning, to thus prevent the grain falling onto the ground during the turning process.

Yet another object of my invention is to provide a grain unloader of the character described wherein the combine drive for the elevator is utilized to impart movement to the endless screw.

And still a further object of my invention is to provide a dual discharge spout associated with the grain elevator which is provided with a valve structure to quickly and readily direct the grain flow into the desired discharge spout.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which:

Figure 1 is a view in side elevation of an Allis-Chalmers combine equipped with the grain unloader forming the present invention.

Figure 2 is an elevational view of the top portion of the combine looking toward the front of the combine and showing the drive between the grain elevator and the unloader.

Figure 3 is a top plan view of Figure 1.

Figure 4 is a plan view, partly broken away and partly in cross section showing the grain unloader and the dual discharge spouts associated with the grain elevator.

Figure 5 is a fragmentary vertical sectional view of the discharge end of the grain unloader, and Figure 6 is a plan view of the pivotally mounted member carried by the rear of the combine to which a wagon or other vehicle may be coupled.

Referring to Figure 1, there is indicated an Allis-Chalmers combine of conventional type 10, to which is mounted a grain unloader denoted generally 11. The unloader 11 comprises a tubular housing 12 which is supported adjacent the rear end thereof by a bracket 13 secured to the top rear portion of the combine, and a second bracket 14 is secured to the housing 12 intermediate the ends thereof and also to the rear of the combine. It can be seen that the bracket 14 is of greater height than the bracket 13 so that the housing 12 will extend upwardly at an angle relative to the combine, and the outer end of the housing supports a downwardly extending discharge end 15, to which a spout 16 is pivotally mounted, as indicated at 17. The housing 12 is formed with an elongated recess 18 adjacent its inner end, and a hopper 19 is secured to the housing, with the open bottom thereof being in registry with the opening 18. An endless screw 20 is journalled within the housing 12, and the outer end of the screw shaft supports a pulley 21 having a V-groove 22. A V-belt 23 is trained around pulley 21 and also around pulley 24 carried by shaft 25 of the combine grain elevator denoted generally 26. Since the grain elevator is of conventional construction, it is not deemed necessary to show and describe the details thereof.

A discharge spout 27 communicates with the grain elevator 26 and extends downwardly therefrom, the open end of the spout being above storage bin 28 on the combine 10. A second discharge spout 29 is suitably secured to the spout 27 and extends angularly therefrom and, as shown in Figures 3 and 4, the open end of the spout 29 is located above the hopper 19. In order to direct the grain leaving the elevator 26 in the desired direction, it will be noted that a valve 30 is pivotally connected to the spout 27 at the point of juncture of the spouts 27 and 29. The pivot rod of the valve 30 extends upwardly through the spout 27 and carries an operating lever 31 which is movable over a segment 32 attached to the spout 27. By moving the operating lever to the position shown in Figure 3, the valve 30 will close the lower end of the spout 27 which will, of course, direct the grain leaving the elevator 26 into the spout 29 and thence into the housing 12 whereby the screw 20 will move the grain to the discharge end of the housing and into the wagon or other vehicle following the combine. Manifestly, if the valve is moved to the broken line position shown in Figure 4, the grain will be directed into the bin 28.

As previously mentioned, it is desirable to stop the flow of the grain during a turning movement of the combine, since during this movement the wagon will be out of the path of the grain emanating from the end of the housing, and to accomplish this end, it will be noted that a damper type valve 33 is pivoted in the discharge end 15 by means of a transversely extending rod 34. One end of the rod 34 is journalled in the discharge end, as indicated at 35, while the opposite end is attached to a lever 36 extending downwardly from the housing. A rope 37 is affixed to the lever 36, as shown at 38, and the rope is of such length as to extend to a point in the vicinity of the driver of the tractor. By pulling on the rope 37, the damper valve 33 will be rotated to a closed position and thus prevent the grain leaving the discharge end 15. Of course, upon release of the rope, the damper will return to its position permitting the grain to leave the discharge end.

In order to couple a wagon or the like (not shown), it can be seen that a tongue 39 is pivotally secured at its inner end to the rear of the combine, as indicated at 40 in Figure 6. The tongue extends through a horizontal slot provided by a pair of spaced horizontal bars or beams 41 attached to the combine, as indicated generally at 42, the bars preventing upward and downward movement of the tongue, yet readily allowing the tongue to pivot about the vertical axis.

The invention is not to be confined to any strict conformity with the showing in the drawings, but may be changed or modified so long as such changes or modifications mark no material departure from the salient features of the invention as expressed in the appended claims.

I claim:

1. A grain unloading attachment for installation on a combine having a power driven grain elevator, a discharge spout communicating with the elevator and a storage bin on the combine, the improvement comprising a material moving means supported by the combine, a drive connection between the material moving means and the power driven grain elevator, a supplemental discharge spout in communication with the discharge spout and with the material moving means, valve means disposed in the discharge spout to direct the grain flow from the elevator through either the discharge spout or the supplemental discharge spout for deposit on the material moving means, further valve means in said material moving means adjacent the outlet thereof to control the discharge of grain therefrom, and means operatively connected to said further valve means to actuate the further valve means.

2. A grain unloading attachment as claimed in claim 1 wherein the material moving means includes a tubular housing, and an endless screw journalled within the housing.

3. A grain unloading attachment as claimed in claim 2 wherein a hopper is mounted on said tubular housing at a point below the supplemental discharge spout.

4. A grain unloading attachment for installation on a combine having a power driven grain elevator, a discharge spout in communication with the elevator and a storage bin on the combine, the improvement comprising a tubular housing rigidly supported by and extending rearwardly of the combine, an endless screw journalled within said housing, a hopper on said housing communicating with the interior thereof, a pulley on said endless screw shaft externally of the housing, a pulley on the power driven elevator, a belt trained around said pulleys whereby the endless screw is driven by the power driven grain elevator, a supplemental discharge spout in communication with the discharge spout and terminating above said hopper, valve means in said discharge spout to direct the grain flow from the elevator through either the discharge spout or the supplemental discharge spout, and a control member on said discharge spout for actuating said valve.

5. A grain unloading attachment as claimed in claim 4 wherein a valve is mounted within said tubular housing adjacent the discharge end thereof to control the flow of grain therethrough, and actuating means operatively connected to said valve to operate the said valve.

RUDOLPH GEORGE HEUN.

REFERENCES CITED

The following references are of record in the file of this patent:

UNITED STATES PATENTS

| Number | Name | Date |
| --- | --- | --- |
| 1,459,247 | Vilar y Pazos | June 19, 1923 |
| 1,615,334 | MacGregor | Jan. 25, 1927 |

FOREIGN PATENTS

| Number | Country | Date |
| --- | --- | --- |
| 116,772 | Australia | Mar. 31, 1943 |